June 25, 1963
V. F. CARTWRIGHT
3,095,564
RANGE MEASURING SYSTEM
Filed Dec. 21, 1959
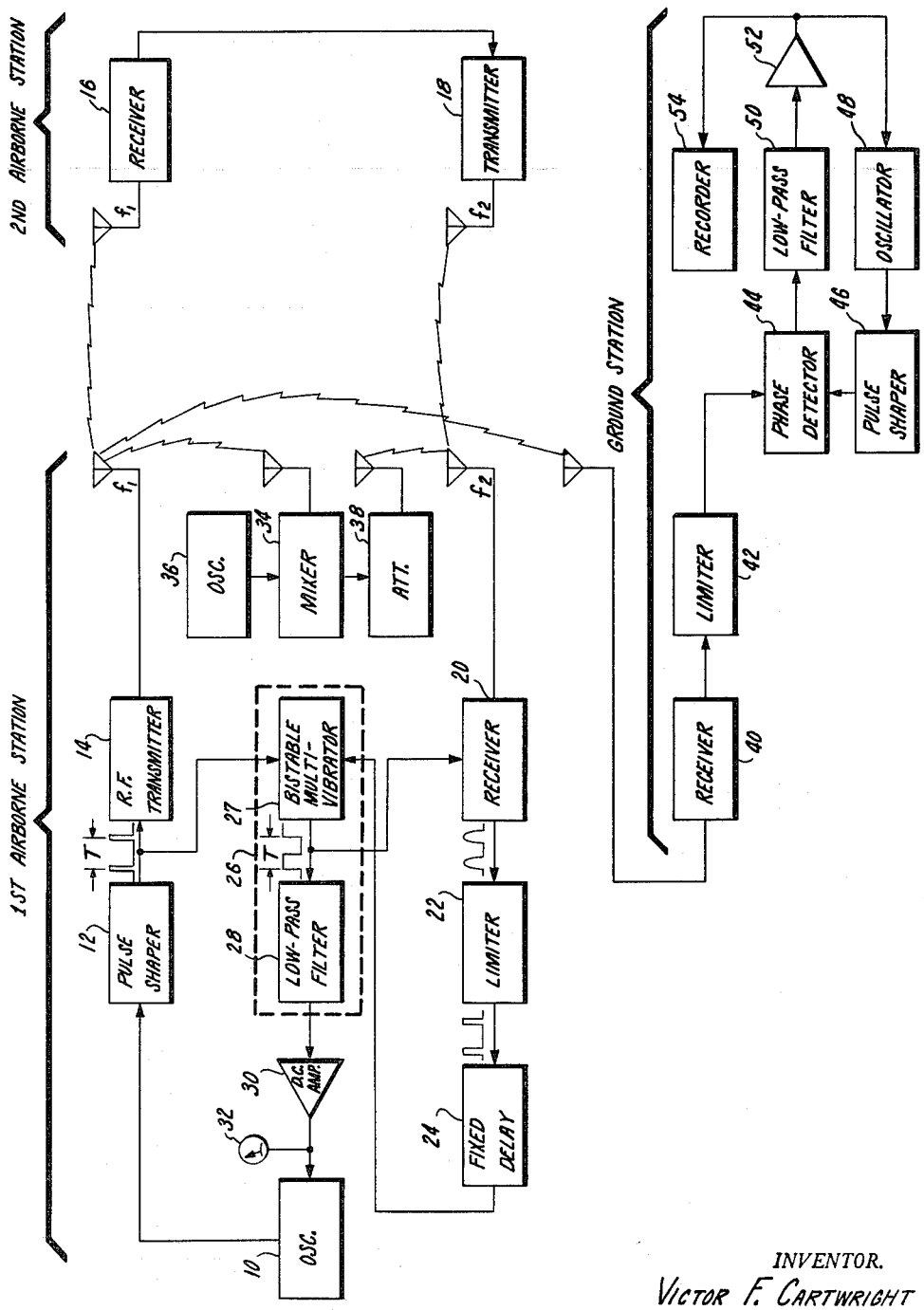
INVENTOR.
VICTOR F. CARTWRIGHT
BY
Christie, Parker & Hale
ATTORNEYS

United States Patent Office 3,095,564
Patented June 25, 1963

3,095,564
RANGE MEASURING SYSTEM
Victor F. Cartwright, Fullerton, Calif., assignor to Traid Corporation, Encino, Calif., a corporation of California
Filed Dec. 21, 1959, Ser. No. 860,834
3 Claims. (Cl. 343—13)

This invention relates to apparatus for measuring range and, more particularly, is concerned with apparatus for continuously measuring the distance between two relatively moving objects.

The need has arisen for sensitive equipment which continuously indicates the distance between two relatively moving objects, such as two high speed aircraft or two converging missiles. Such range-indicating equipment should be as light and compact as possible. It preferably should provide means for sending range information to a remote monitoring point, such as a ground station. It must be reliable and yet provide accurate range information over a large dynamic range; for example, a range of several thousand yards down to a few yards and, at the same time, provide an indication over a wide variation in rates to accommodate the very high velocities encountered in jet aircraft and rocket powered devices.

One such system is described in my copending application Serial No. 596,246 filed July 6, 1956 now Patent No. 2,921,301. The system therein described utilizes the well-known "singing-frequency" principle in which two transponders located at separated points cooperate in such a manner that a space-coupled oscillator is created. The frequency of the oscillation is a function of transponder separation. One of the difficulties of such a system is that oscillation must be initiated by noise in the system. It is possible in such a system, when oscillation has been interrupted as when one transponder has been out of range of the other, that there is a delay in the starting of oscillation which may be troublesome, particularly at the high closing velocities of the transponders.

The distance measuring system of the present invention does not include an oscillating loop; therefore, there is no problem of starting oscillation again after an interruption.

In brief, the system of the present invention includes two transmit-receive stations located at the respective points between which the distance is to be measured. These stations may be airborne in two relatively moving vehicles. In addition, there may be a remote monitoring station, such as a ground station, in which the distance information can be reproduced and recorded. One airborne station has a simple transponder which receives signals on one carrier frequency and retransmits them on a carrier of a different frequency. The other station includes a transmitter tuned to the same frequency as the receiver of the transponder, and a receiver tuned to the same frequency as the transmitter of the transponder. The transmitter is modulated by means which generates short pulses at a controlled repetition rate. This pulse information is returned by the transponder to provide a pulse signal in which the pulses are delayed by an amount determined in part by the distance between the two stations. The generated pulse signal and the return pulse signal are both applied to a phase sensitive device, the output of which is passed through a low-pass filter, amplified and used to control the pulse repetition rate of the pulse generating means. The pulse repetition rate is automatically adjusted to balance the system so that the return pulses bear a predetermined phase relationship to the transmitted pulses. The pulse repetition rate at which balance occurs is a function of the distance between the stations. A receiver at a ground station tuned to either of the carrier frequencies can monitor the distance information which is a function of the period between modulation pulses.

Distance information is contained in the form of pulse separation. This separation is always proportional to twice the actual distance. Since the rate of change in information is twice the rate of change of distance, the information may be sampled at half the rate for a given resolution of distance. By virtue of the low-pass filter on the output of the phase sensitive device, the post-detection system bandwidth is the minimum possible for a given rate of change of distance. Thus disturbances such as high frequency noise cannot enter into the system and obliterate the data. Other advantages and improvements in the system of the present invention will become apparent from the following detailed description.

For a more complete understanding of the invention, reference should be made to the accompanying drawing, wherein the single figure is a block diagram of the distance measuring system.

Referring to the single figure in detail, the system includes a first airborne station and a second airborne station and may include a ground station. The first airborne station includes an electronically tuned oscillator 10. The output of the oscillator 10 is variable over a substantial range by changes in the potential of an input signal. Electronically tuned oscillators of this type are well known in the art.

The output of the oscillator 10 is applied to a pulse shaping circuit 12 which changes the sine wave from the oscillator to a series of narrow pulses having a repetition frequency corresponding to the fundamental frequency of the oscillator output. The output of the pulse shaper 12 is used to modulate an R.F. transmitter 14 which transmits a carrier frequency $f_1$.

The second airborne station comprises a simple transponder including a receiver 16 and a transmitter 18 for receiving the pulse modulated carrier at the frequency $f_1$ and retransmitting it at a frequency $f_2$.

The retransmitted signal is received at the first airborne station by a receiver 20 which demodulates the received signal and applies the pulse information to a limiter circuit 22 for squaring and amplifying the demodulated pulses. The output of the limiter circuit 22 is applied through a fixed delay circuit 24, such as the delay line, to one input of a phase sensitive device 26. The output of the pulse shaper 12 is also applied to another input of the phase sensitive device 26. The phase sensitive device 26 preferably comprises a bistable multivibrator 27 which is triggered to one stable state by the pulses from the pulse shaper 12 and triggered to its other stable state by the pulses at the output of the delay line 24. Thus the output of the phase sensitive device 26 is a rectangular wave whose leading edges are synchronized with the pulses from the pulse shaper 12 and whose trailing edges are synchronized with the pulses from the delay line 24. Thus the output from the multivibrator 27 is a rectangular wave in which the ratio of "on" time to "off" time varies according to the time or place relationship between the two periodic input signals. As the time relationship between the two input signals varies, the ratio of the "on" time to "off" time increases or decreases accordingly.

The rectangular wave from the output of the multivibrator is applied to a low-pass filter 28. The low-pass filter acts as an averaging circuit which integrates the output of the multivibrator to produce a varying D.C. signal, the magnitude of which is indicative of the ratio of the "on" time to "off" time of the rectangular wave. If this ratio is unity, the output of the averaging circuit is zero, or any other predetermined D.C. level with respect to ground. If this ratio is greater than unity, the averaging circuit output level increases, and if the ratio is less than unity, the output level of the averaging circuit decreases.

This signal is amplified by suitable D.C. amplifier 30 and used as the control signal for the electronically tuned oscillator 10.

From the description of the circuit thus far, it will be apparent that changing the frequency of the oscillator 10 results in a change of pulse repetition rate of both inputs to the phase sensitive device 26. The period between pulses is such that the total delay introduced by the separation of the airborne stations plus the delay introduced by the various circuits including the delay line 24 is a predetermined fraction of the period between pulses; for example, one half. The particular phase sensitive device 26 described above is arranged to produce a zero output when the two inputs to the multivibrator are a half pulse period apart. When the system is balanced, the total delay in the return pulses is equal to half the pulse period. This may be expressed by the mathematical relation $$T = 2\left(t_e + \frac{2R}{C}\right)$$

where $T$ = the period between pulses,
$t_e$ = the time delay introduced by the equipment including the delay line 24,
$R$ = the distance between the two airborne stations, and
$C$ = the velocity of light.

Thus the output frequency of the output oscillator 10 provides a measure of the distance R between the two stations. A direct indication of distance can be provided by means of a D.C. voltmeter 32 connected to the output of the D.C. amplifier 30. By proper calibration of the scale on the D.C. voltmeter, it can be made to indicate directly in terms of range or distance between the two stations.

In calibration of the system, the output of the transmitter 14 is coupled directly to the input of the receiver 20. This is accomplished by means of a mixer 34 which receives the output from the transmitter 14 and also the output from an oscillator 36. The difference frequency from the output of the mixer has a value $f_2$ and is reradiated after being attenuated by a suitable attenuator 38. Attenuator 38 is normally set so that the signal picked up at the receiver 20 is at the same strength as a signal received from the transmitter 18 at its desired maximum range. Thus, whenever the second airborne station is out of range, the transmitter 14 is coupled directly to the receiver 20 without any measurable time delay except for the delay 24. The term including range R in the above equation becomes zero and the period of the oscillator 10 is therefore equal to twice the time delay of the equipment. Since most of the delay of the equipment is in the delay line 24, the delay line is adjusted to introduce a time delay equal to approximately half the period of the oscillator 10 at the upper end of its range of frequency adjustment.

When the second airborne station comes within range, the signal received from the tranmsitter 18 becomes substantially stronger than the signal derived from the mixer 34. The automatic gain control of the receiver 20 is reduced to the point where the signal derived from the mixer 34 no longer produces pulses of sufficient magnitude to drive the bistable multivibrator 27. At this time, the signal derived from the transmitter 18 takes over and the oscillator 10 is readjusted by the servo loop in the manner discussed above.

One of the features of the present invention is that since the range information is a function of the modulating pulse repetition rate, the range information can be directly monitored at a ground station. To this end, the ground station is provided with a receiver 40 for receiving the carrier $f_1$. The demodulated output of the receiver 40 is applied through a limiter circuit 42 to one input of a phase detector 44. The other input to the phase detector 44 is derived from a pulse shaper 46 which is part of a servo loop including an electronically controlled oscillator 48 which is controlled by the output of the phase detector 44 through a low-pass filter 50 and D.C. amplifier 52. A suitable indicator or recorder 54 coupled to the output of the D.C. amplifier 52 gives a continuous indication of range.

From the above description, it will be recognized that a distance measuring system is provided which is capable of operating over a wide dynamic range. Jitter and noise is reduced by a large factor due to the integration provided in the servo filter. This filter has only adequate bandwidth to pass frequencies corresponding to the maximum rate of change of data. The equivalent of this arrangement cannot be duplicated by filtering the pulse frequency due to the severe phase distortion through such a filter as a function of frequency.

Continuous system calibration is possible, and no special provision is required for resolving measurement ambiguities.

The output of the multivibrator 27 of the phase sensitive device can be used to provide a blanking pulse for the receiver 20. Thus the receiver 20 is biased off immediately following the receiving pulse so that any signals appearing in the system following the direct signal are eliminated.

What is claimed is:

1. A miss-distance measuring system for indicating the minimum distance between two moving stations, one of which is a missile and the other of which is a target, the system comprising, at one station, a transponder for receiving modulated signals at a first carrier frequency and transmitting them at a second frequency, and at the other moving station, means for generating pulses at a controllable repetition rate variable over a predetermined range, a transmitter having a carrier at said first carrier frequency and modulated by the output of the pulse generating means, a receiver for demodulating signals received at said second carrier frequency, delay means coupled to the output of the receiver having a delay time substantially equal to half the minimum period between pulses within said predetermined range of repetition rates, a phase sensitive device for generating an output signal indicative of the phase relation between two input pulse trains, said phase sensitive device being coupled to the output of the pulse generating means and the output of the delay means for producing a control signal in response to variations in the phase relationship of the transmitted and received pulses, means for controlling the pulse repetition rate of the pulse generating means in response to the control signal from the phase sensitive device, whereby the pulse repetition rate of the pulse generating means is varied in proportion to changes in the total phase relation between the two pulse train signals applied to the phase sensitive device, and means for coupling the output of the transmitter directly to the input of the receiver at said other station, said coupling means including an attenuator for reducing the signal strength at the receiver to substantially the level of the maximum range signal from the transponder.

2. Apparatus as defined in claim 1 further including a monitoring receiving station for receiving signals transmitted by one of said transmitters, and means at said receiving station for sensing the modulation period, said sensing means producing a continuous indication of range between the missile and target in response to the modulation period.

3. A miss-distance measuring system for indicating the minimum distance between two moving stations, one of which is a missile and the other of which is a target, the system comprising, at one station, a transponder for receiving modulated signals at a first carrier frequency and transmitting them at a second frequency, and at the other moving station, means for generating pulses at a controllable repetition rate variable over a predetermined range, a transmitter having a carrier at said first carrier frequency and modulated by the output of the pulse generating means, a receiver for demodulating signals received at said second carrier frequency, delay means coupled to the output of the receiver for delaying the received pulses by a predetermined amount, a phase sensitive device for generating an output signal indicative of the phase relation between two input pulse trains, said phase sensitive device being coupled to the output of the pulse generating means and the output of the delay means for producing a control signal in response to variations in the phase relationship of the transmitted and received pulses, and means for controlling the pulse repetition rate of the pulse generating means in response to the control signal from the phase sensitive device, whereby the pulse repetition rate of the pulse generating means is varied in proportion to changes in the total phase relation between the two pulse train signals applied to the phase sensitive device.

References Cited in the file of this patent

UNITED STATES PATENTS

| | | |
|---|---|---|
| 2,134,716 | Gunn | Nov. 1, 1938 |
| 2,537,593 | Landon et al. | Jan. 9, 1951 |
| 2,699,544 | Hasbrook | Jan. 11, 1955 |
| 2,728,907 | Grunsky | Dec. 27, 1955 |
| 2,779,018 | Gregoire et al. | Jan. 22, 1957 |
| 2,946,050 | Wathen | July 19, 1960 |